United States Patent Office 2,773,886
Patented Dec. 11, 1956

2,773,886

DERIVATIVES OF 3-HYDROXY-17-CYANO-Δ1,3,5(10),16-ESTRATETRAENE

Leon Velluz and Georges Muller, Paris, France, assignors to Les Laboratoires Francais de Chimiotherapie, Paris, France, a body corporate of France No Drawing. Application August 24, 1954, Serial No. 451,952

Claims priority, application France January 2, 1948

3 Claims. (Cl. 260—397.5)

This invention relates to 17-cyano compounds derived from compounds of the cyclopentano polyhydrophenanthrene series, and more particularly to 17-cyano compounds derived from estrone, and to derivatives of said cyano compounds.

This application is a continuation-in-part of our prior copending application Serial No. 66,136, filed November 18, 1948, now abandoned, and a continuation-in-part application of our copending application Serial No. 272,706, filed February 20, 1952, now Patent No. 2,700,674.

The new cyano compounds according to this invention are represented by the following structural formulas

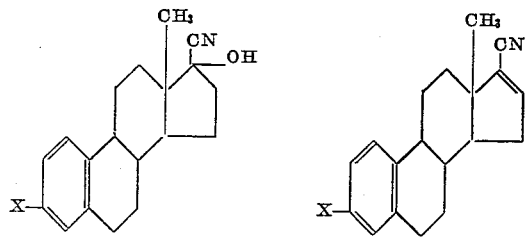

wherein X is an acyloxy group.

These cyano compounds are converted, as described hereinafter, into methyl ketone compounds of the following structural formula

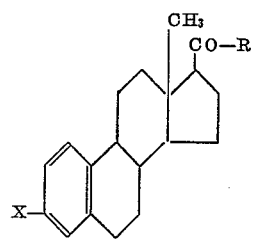

wherein R is a methyl group and X a member of a group selected from the groups, consisting of a hydroxyl group and a group convertible, by hydrolysis, into a hydroxyl group, such as an ester group.

These novel methyl ketone compounds, in addition to their utility in the synthesis of useful related substances, are physiologically active and may be employed in human or veterinary medicine as estrogenic substances.

In general terms, the synthesis of these novel compounds is effected as follows: estrone is treated with an acylating agent to convert the 3-hydroxy group to an acyloxy group; the reaction product is then reacted with hydrogen cyanide whereby the 17-keto group is converted to a cyanohydrin group; this compound is then treated with a dehydrating agent to split off water between the carbon atoms 16 and 17 and to produce the corresponding nitrile with an unsaturated linkage between carbon atoms 16 and 17 of the ring system and a nitrile substituent in 17-position. This last mentioned reaction product, after being reacted with Grignard reagent followed by conversion to the corresponding ketimine and hydrolysis, yields the corresponding 17-methyl ketone compound, unsaturated in the linkage between the carbon atoms in 16- and 17-positions of the ring system and with a —CO—CH₃ substituent in 17-position. Said unsaturated methyl ketone compound is then hydrogenated to cause addition of hydrogen solely to the Δ16,17-double bond of the ring system, yielding the desired saturated methyl ketone compound of the formula set forth above. Derivatives of the 3-hydroxy group of said methyl ketone, such as the acyloxy derivatives, are obtained in the course of the above described reaction by subsequent acylation of the 3-hydroxy group in the Δ16,17-unsaturated as well as in the saturated final 17-methyl ketone.

The synthesis may be represented by the following formulas, X being acyloxy and Hal being a halogen:

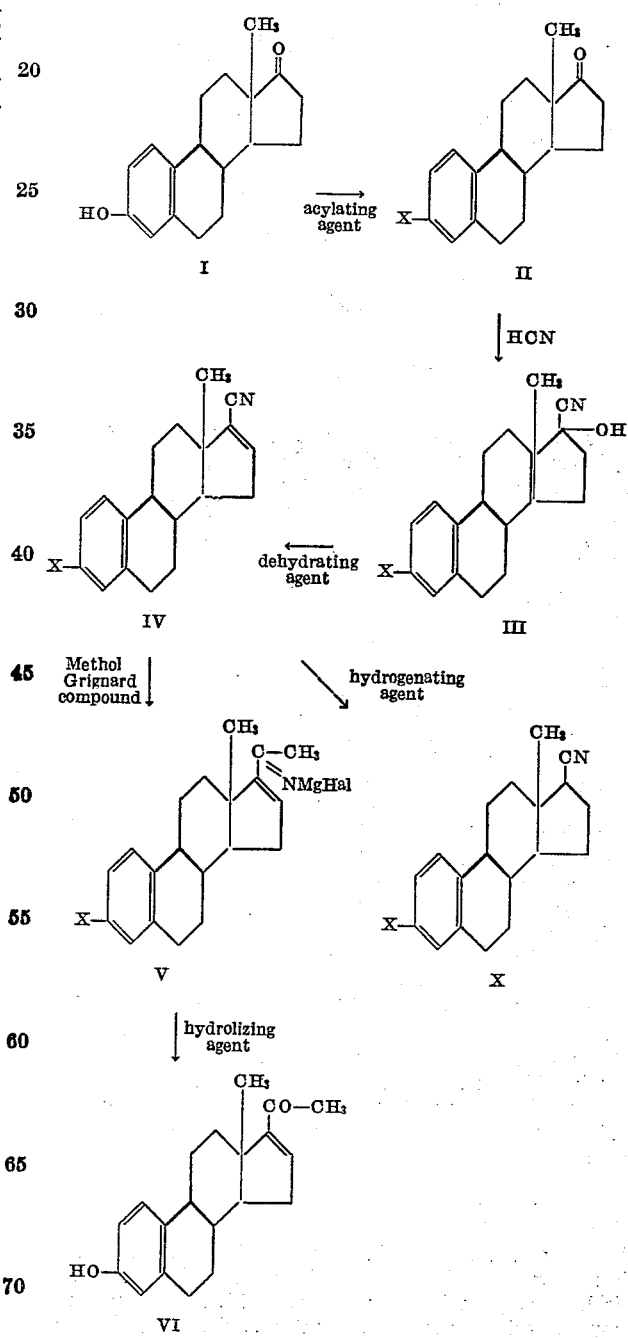

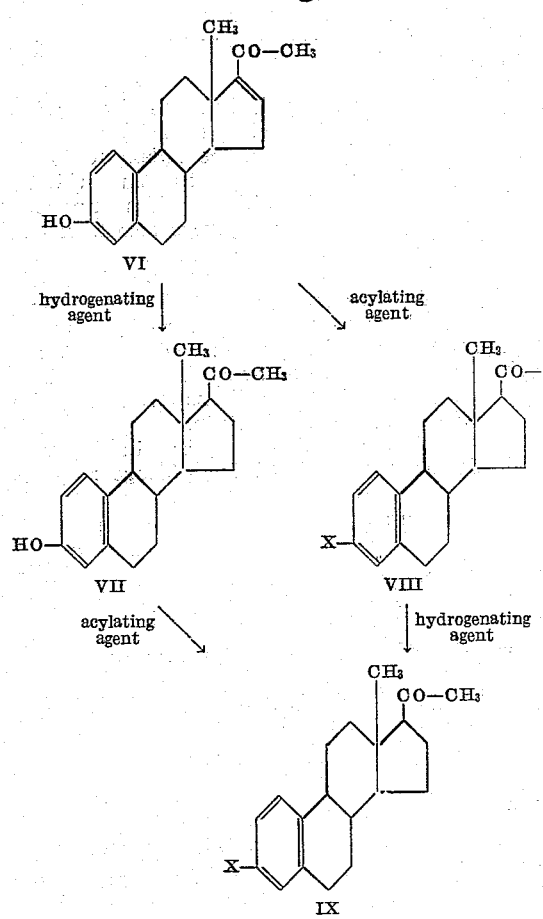

As acylating agents there are preferably used acid anhydrides and acid halogenides. One may, however, employ the acids themselves, especially in the presence of catalysts capable of accelerating splitting off of water. Especially suitable acylating agents are acetic acid anhydride or acetyl chloride, preferably in the presence of a tertiary base, such as pyridine, diethyl aniline, quinoline and the like, and, in the case of the acid chloride, of an alkaline agent, such as sodium hydroxide, carbonate, bicarbonate and the like. It is also possible, first to produce a salt, preferably an alkali salt of the phenolic hydroxyl group in estrone, and then to react said salt with an acid halogenide. One may furthermore proceed by reacting the phenolic compound and the corresponding acid or its alkali salt in the presence of phosphorus oxychloride, phosphorus pentachloride and the like. Other methods of acylating said phenolic starting materials, such as estrone or the unsaturated or saturated methyl ketones obtained according to this invention, as they are known in the art, may also be used. In the place of acetic acid and its anhydride or chloride, other aliphatic as well as aromatic and heterocyclic acids and their anhydrides and halogenides may be reacted, such as propionic acid, butyric acid, valeric acid, stearic acid, palmitic acid, oleic acid, oxalic acid, malonic acid, adipic acid, acrylic acid, maleic acid, fumaric acid, or substituted aliphatic acids, such as chloro acetic acid, lactic acid, tartaric acid, malic acid, citric acid and others. Cycloaliphatic acids and their anhydrides and halogenides, such as saturated and unsaturated cyclopentane carboxylic acids, cyclohexane carboxylic acids and the like, such as cyclopentane and cyclohexane acetic and propionic acids, may also be used. The most suitable aromatic carboxylic acid or its reactive derivative which may be reacted according to this invention, is benzoyl chloride, but other aromatic acids and their halogenides or anhydrides, such as substituted benzoic acids like p-nitrobenzoyl chloride, m-nitro benzoyl chloride, the halogenides of methyl benzoic acids, phenyl acetic acid, cinnamic acid, hydrocinnamic acid, phthalic acid, salicyclic acid, anthranilic acid, hippuric acid, mandelic acid and others may also be employed. Suitable heterocyclic acids are, for instance, nicotinic acid and other pyridine carboxylic acids, furane-2-carboxylic acid, quinoline carboxylic acids and others.

It is understood that all carboxylic acids can be used in this reaction which are ordinarily employed in steroid chemistry for the protection of hydroxyl groups against the action of agents affecting hydroxyl groups, such as oxidizing agents, agents capable of splitting off water and/or the like. Especially suitable are the lower aliphatic carboxylic acids, the cyclopentane and cyclohexane carboxylic acids, and the benzoic acids.

To produce he cyanohydrin compound, hydrocyanic acid as such is added to the ketonic starting material. Said hydrocyanic acid may also be produced in statu nascendi, for instance, by using a mixture of an alkali cyanide and an organic acid, such as potassium cyanide and acetic acid.

The dehydrogenation of the cyanohydrin compound to the corresponding nitrile compound is carried out in a manner known per se by means of agents capable of splitting off water. Phosphorus halogenides, such as phosphorus oxychloride, preferably in a solvent capable of binding halogen hydride, such as a tertiary base like pyridine, has proved to be especialy suitable.

As Grignard reagent, the magnesium compounds of methyl halogenides, such as methyl magnesium bromide are preferably used. It is, of course, possible to react the nitrile with other suitable organio-metallic compounds, such as zinc methyl, lithium methyl and the like.

Hydrolysis of the Grignard reaction product of the nitrile is effected, for instance, by heating with inorganic or organic acids, such as alcoholic sulfuric acid, aqueous ammonium chloride solution, glacial acetic acid, dilute aqueous acetic acid and others.

The $\Delta^{16,17}$-double bond in the unsaturated ketone obtained thereby is hydrogenated by any known means capable of adding hydrogen to and, thereby, saturating a double bond. In particular, it is recommended to employ catalytically activated hydrogen. As catalysts there are used such catalysts which do not cause hydrogenation of aromatic compounds, i. e., catalysts of comparatively mild activity, especially activated nickel catalysts and preferably Raney nickel which is employed at ordinary pressure and room temperature in neutral or weakly alkaline medium.

It is, of course, also possible to first hydrogenate the unsaturated nitrile to the corresponding saturated nitrile, to react said nitrile with a methyl Grignard compound, to hydrolyze the ketimine obtained thereby and, if required, to acylate the saturated methyl ketone.

In the course of this reaction new and valuable intermediate and final products are obtained, namely the cyanohydrin of Formula III and its 3-acyloxy derivatives, the saturated and unsaturated nitriles of Formulas X and IV, respectively, and their 3-acyloxy derivatives, and the saturated and unsaturated 17-methyl ketones of Formulas VII and VI and their 3-acyloxy derivatives.

The following examples describe in detail the synthesis of the intermediate and final products according to this invention as mentioned above.

EXAMPLE 1

3-acetoxy-17-keto-$\Delta^{1,3,5}$-estratriene (estrone acetate)
(II)

3. g. of estrone (I) are dissolved in 20 cc. of pyridine and 15 cc. of acetic acid anhydride are added to said solution. The mixture is heated under reflux at 105° C. on an oil bath for an hour and a half. The reaction mixture is cooled. 200 cc. of water and thereafter 10 cc. of methanol are added, and the solution is extracted with ethyl acetate. The extract is acidified to a pH of 3.0 by the addition of dilute sulfuric acid (1:5). The estrone acetate solution is washed with water, dried, and distilled to dryness. The residue is recrystallized from ethanol. The pure estrone acetate (II) obtained thereby has a melting point of 123–124° C. $(\alpha)_D = +128°$; $(CHCl_3, C=0.5\%)$

*3-acetoxy-17-cyanohydrin-Δ-$^{1,3,5}$-estratriene (III)*

3 g. of estrone acetate (II) obtained as described above, are dissolved in 65 cc. of ethanol and 25 cc. of acetic acid. 9 g. of potassium cyanide are added to said solution. The reaction mixture is then agitated for a period of 24 hours. Water is added and the reaction product is extracted with benzene. The benzenic solution is washed with water, dried and distilled to dryness. The residue is recrystallized from ethyl acetate. The pure cyanohydrin (III) has a melting point of 197–198° C. $(\alpha)_D = +21°$; $(CHCl_3, C=1\%)$

*3-acetoxy-17-cyano-Δ-$^{1,3,5,16}$-estratetraene (IV)*

1 g. of the cyanohydrin (III) obtained as described above, 3 cc. of anhydrous pyridine and 1 cc. of phosphorus oxychloride are placed into a heavy-walled glass tube. The tube is sealed and heated for an hour and a half at a temperature of 150° C. in an oil bath. After cooling to about 110° C. the tube is opened and the liquid poured on ice. The mixture is acidified to a pH of 3.0 by the addition of hydrochloric acid, and the reaction product is extracted by means of ethyl acetate. The extract is washed with water, dried and distilled to dryness. The residue is recrystallized from ethanol. The nitrile (IV) obtained has a melting point of 114–115° C $(\alpha)_D = +72°$; $(CHCl_3, C=0.5\%)$

*3-hydroxy-17-methylketo-Δ-$^{1,3,5,16}$-estratetraene (VI)*

Into a flask provided with a reflux cooler, there are introduced 3 g. of magnesium and 40 cc. of ether. Thereto sufficient (15 to 20 g.) liquid methyl bromide is added in small amounts until the magnesium is completely dissolved. 1 g. of the nitrile (IV) obtained as described above, is added to said solution and the mixture is heated under reflux at a temperature between 50 and 60° C. for a period of 24 hours. The reaction mixture is poured on ice and the resulting magnesium compound is dissolved in glacial acetic acid. After heating the reaction mixture at 100° C. for one hour, the precipitated ketimine is filtered off, dissolved in 20 parts by volume of glacial acetic acid to which 2 parts by volume of water are added, and heated under reflux at 100° C. for 15 minutes. Hydrolysis of the ketimine produces the unsaturated methylketone (VI) which contains no acetoxy group in 3-position, but a free hydroxy group and has a melting point of 256° C. $(\alpha)_D = +115°$; $(CHCl_3, C=0.2\%)$

*3-hydroxy-17-methylketo-Δ-$^{1,3,5}$-estratriene (VII)*

1 g. of the unsaturated ketone (VI) obtained as described above is dissolved in 120 cc. of ethanol. 1 g. of Raney nickel catalyst is added to said solution and the pH of the same is adjusted to about 10.0 by the addition of a few drops of a sodium hydroxide solution. Hydrogen is then passed through the mixture until the saturated methylketone (VII) is formed. Said compound is precipitated from the reaction mixture by the addition of water. It is filtered off and recrystallized from ethanol. Its melting point is 254° C. $(\alpha)_D = +151°$; $(CHCl_3, C=0.5\%)$.

The 3-hydroxy-17-methlyketo-Δ-$^{1,3,5}$-estratriene obtained hereby is physiologically active and is employed therapeutically as mentioned above.

EXAMPLE 2

Reacting estrone in the same manner as described in Example 1 but using, in place of acetic acid anhydride, an equimolecular amount of propionic acid anhydride yields 3-propionyloxy-17-cyanohydrin-Δ-$^{1,3,5}$-estratriene.

Said cyanohydrin yields, on splitting off water as described in Example 1, 3-propionyloxy-17-cyano-Δ$^{1,3,5,16}$-estratetraene.

By proceeding according to Example 1, the same 3-hydroxy-17-methyl keto-Δ$^{1,3,5}$-estratriene and 3-hydroxy-17-methyl keto-Δ$^{1,3,5,16}$-estratetraene are obtained from said nitriles as according to Example 1 from the acetoxy nitriles.

EXAMPLE 3

Starting with estrone benzoate and adding thereto hydrocyanic acid in a similar manner as described in Example 1, yields 3-benzoyloxy-17-cyanohydrin-Δ$^{1,3,5}$-estratriene.

Splitting off water therefrom as described in Example 1, yields 3-benzoyloxy-17-cyano-Δ$^{1,3,5,16}$-estratetraene.

Said compound, on proceeding according to Example 1, is also converted into 3-hydroxy-17-methyl keto-Δ$^{1,3,5,16}$-estratetraene and 3-hydroxy-17-methyl keto-Δ$^{1,3,5}$-estratriene.

In place of the estrone esters used in the preceding examples there may, of course, be used other esters as stated hereinbefore. Said esters are produced, for instance, by using, in place of acetic acid anhydride employed in Example 1 as acylating agent, equimolecular amounts of the corresponding acid anhydrides and proceeding according to the process disclosed in said Example 1 or by using equimolecular amounts of acid halogenides in place of benzoylchloride employed in Example 3 and proceeding according to the process disclosed in said Example 3. In this manner n-butyric acid anhydride or chloride yield estrone n-butyrate, iso butyric acid chloride yields estrone isobutyrate, n-valeric acid anhydride or chloride yield estrone n-valerate, p-toluic acid anhydride or chloride yield estrone p-toluate, cyclopentano acetyl or propionyl chloride yield estrone cyclopentyl acetate or propionate, stearic acid chloride yields estrone stearate, and other acid anhydrides or chlorides yield the corresponding esters of estrone.

Reacting said estrone esters with hydrocyanic acid as described in Example 1 yields the corresponding 3-n-butyryloxy, 3-isobutyryloxy, 3-n-valeryloxy, 3-p-toluoyloxy, 3-cyclopentyl acetyloxy, 3-cyclopentyl propionyloxy, and other 3-acyloxy-17-cyanohydrin-Δ$^{1,3,5}$-estratriene compounds which subsequently can be converted by splitting off water according to the present invention into the corresponding 3-n-butyryloxy, 3-isobutyryloxy, 3-n-valeryloxy, 3-p-toluoyloxy, 3-cyclopentyl acetyloxy, 3-cyclopentyl propionyloxy, and other 3-acyloxy-17-cyano-Δ$^{1,3,5,16}$-estratetraene compounds.

Of course, many other changes and variations in the reaction compounds, the reaction conditions, the solvents used, the reaction temperature and duration, the methods of working up the reaction mixture and of isolating and purifying the reaction product and the like may be made by those skilled in the art in accordance with the principles set forth herein and in the claims annexed hereto.

We claim:

1. As a new product, a derivative of 3-hydroxy-17-cyano-Δ$^{1,3,5,16}$-estratetraene of the following formula

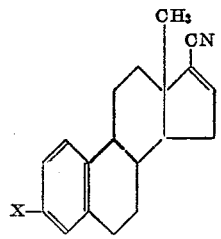

wherein X is an acyloxy group, the acyl residue of said acyloxy group being selected from the group consisting of the unsubstituted lower aliphatic carboxylic acid radical, the cyclopentane carboxylic acid radical, the cyclohexane carboxylic acid radical, and the benzoic acid radical.
2. As a new product, 3-acetoxy-17-cyano-$\Delta^{1,3,5,16}$-estratetraene of the following formula
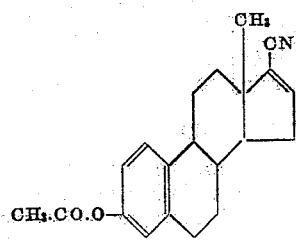
3. As a new product, 3-benzoyloxy-17-cyano-$\Delta^{1,3,5,16}$-estratetraene of the formula
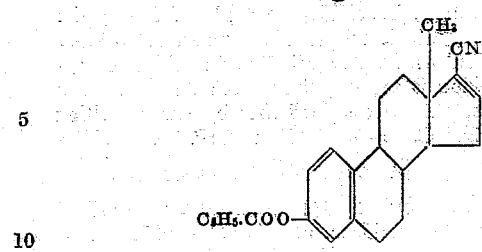
References Cited in the file of this patent
UNITED STATES PATENTS
2,700,674    Velluz _____ Jan. 25, 1955